April 30, 1929.     P. W. BERRY     1,711,303
APPARATUS FOR PROJECTING COLORED BEAMS OF LIGHT
Filed April 30, 1924     2 Sheets-Sheet 1

INVENTOR
Percy William Berry
BY
his ATTORNEY

April 30, 1929.  P. W. BERRY  1,711,303
APPARATUS FOR PROJECTING COLORED BEAMS OF LIGHT
Filed April 30, 1924   2 Sheets-Sheet 2

INVENTOR
Percy William Berry
BY
his ATTORNEY

Patented Apr. 30, 1929.

1,711,303

UNITED STATES PATENT OFFICE.

PERCY WILLIAM BERRY, OF READING, ENGLAND, ASSIGNOR, BY MESNE ASSIGNMENTS, TO HOLOPHANE COMPANY, INC., OF NEW YORK, N. Y., A CORPORATION OF NEW YORK.

APPARATUS FOR PROJECTING COLORED BEAMS OF LIGHT.

Application filed April 30, 1924, Serial No. 710,151, and in Great Britain May 1, 1923.

The object of the present invention is the manufacture of an apparatus for projecting colored beams of light and more particularly to a color filter adapted to be used with a projector such as cinematograph projector for illuminating a screen or stationary picture when the projector is not being used for exhibiting a film.

As in cinematograph theatres the performance is usually continuous, it becomes essential that a very accurate time table must be closely adhered to, and it often occurs that small intervals must be allowed between successive items of the program. Such intervals are, naturally, unpopular and the present invention allows of their being used for entertaining the audience by illuminating a stationary picture so as to represent, for example, the gradual change from night into day and again from day into night by the projection of appropriate and gradually changing colors.

Briefly stated, the present invention comprises a continuous color filter having a succession of colors merging into one another, adapted to be moved in any desired manner across the projected beam of light. Preferably, a repeating series of colors are used so that the same color cycle can be repeated without the necessity for shutting off the light and bringing the screen back to its original position. The screen is moved by screw or equivalent means, and is preferably provided with a sheet of plain glass on one side to protect the color screen, and a second sheet of rolled plate glass on the other side, which serves to protect the color screen and to diffuse and soften the beam of light.

One embodiment of the invention is shown in the accompanying drawings, in which.

Figure 1:
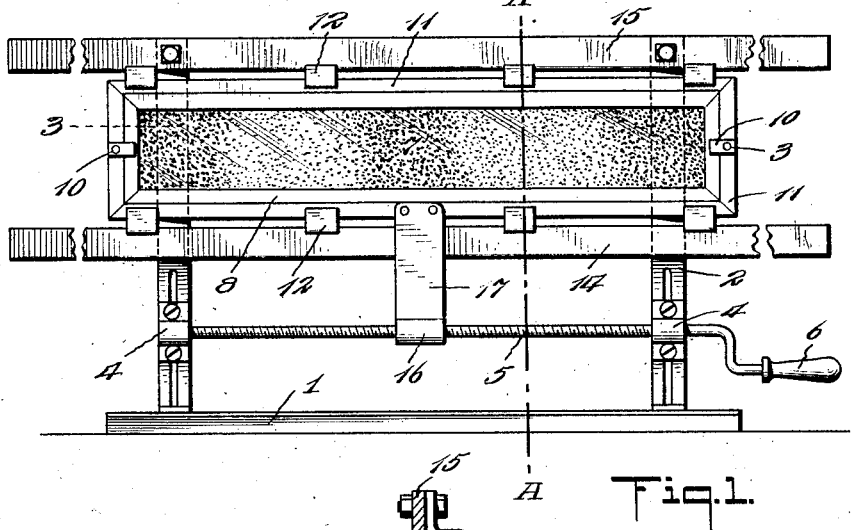
Fig. 1 shows a front view of the apparatus.
Figure 2:
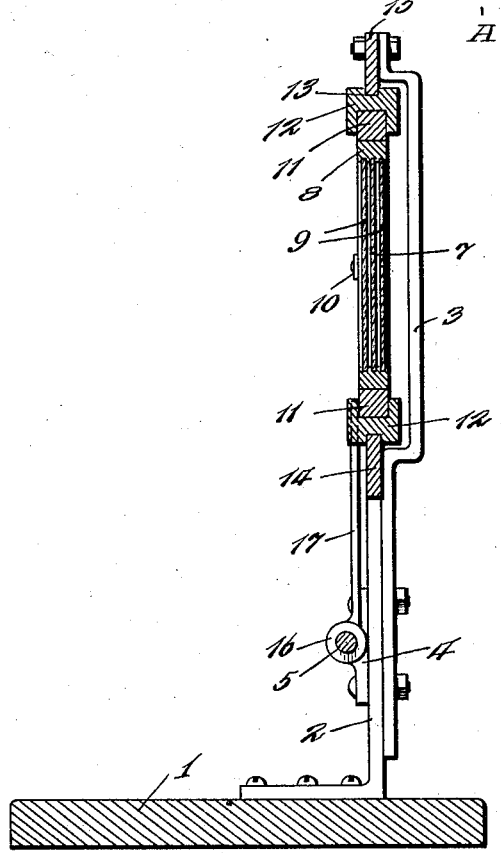
Fig. 2 shows a section on the line 2—2 of Fig. 1.

Referring now to the drawings, on a suitable baseboard 1, which may be of any convenient construction or form, is mounted a pair of standards 2, to which are bolted supports 3 and bearings 4 which carry an operating screw 5. Any suitable means are provided for preventing end movement of the screw, which carries a handle 6. A color screen 7 having the desired series of colors is mounted in a frame 8, with a protecting glass cover 9 on each side, one being of plain glass and the other of rolled plate. They are preferably spaced apart from the screen, as shown, but if desired may be in contact. The frame 8 is held by means of catches 10 in a second frame 11 preferably of aluminum, conveniently provided with a series of shoes 12, thus reducing friction and enabling the operator to manipulate easily the apparatus. The shoes are preferably of gun metal and are slotted at 13 to work on a pair of steel guide bars 14, 15, attached respectively to the standards 2 and the supports 3. The screen is traversed from the operating screw 5 by means of a nut 16 and a connecting piece 17. It will be seen that the screen can be traversed at any desired rate or stopped at any point, by suitable manipulation of the handle 6.

Figure 3:
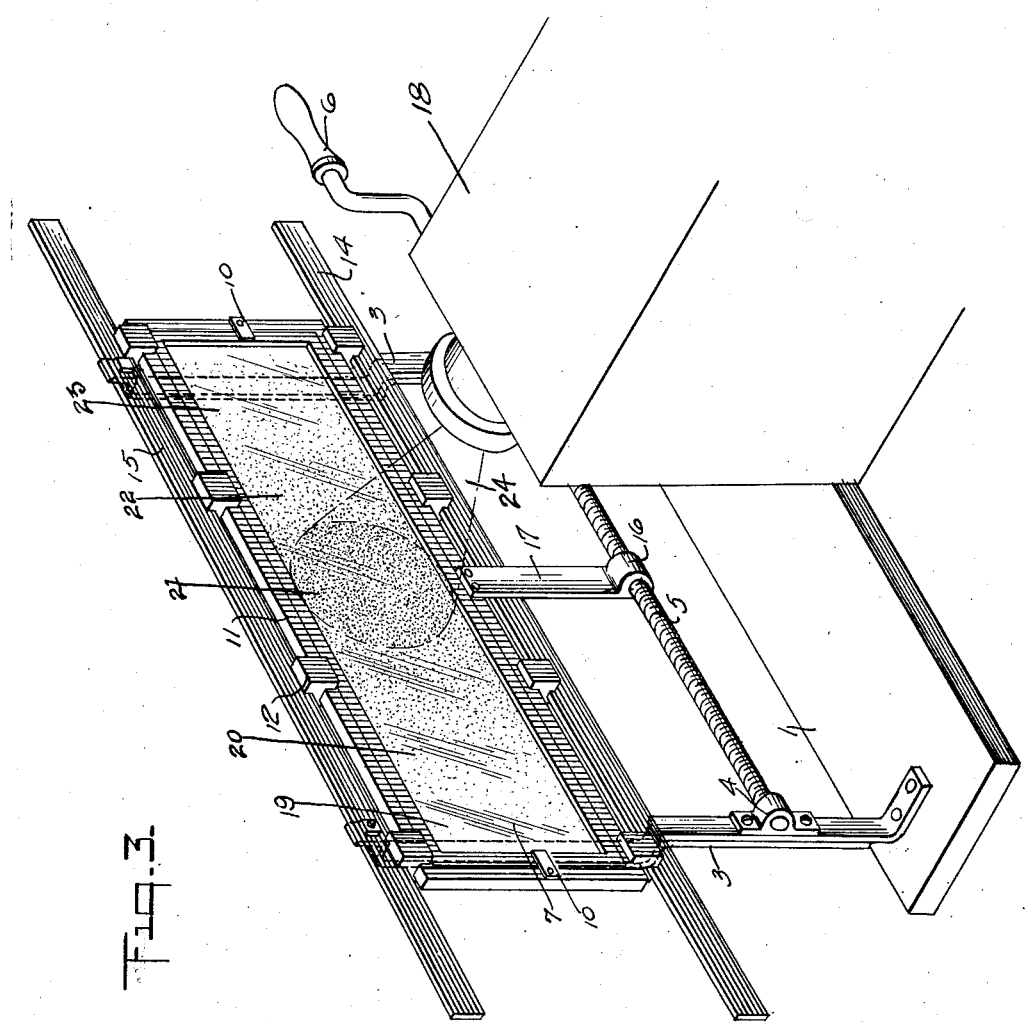
Fig. 3 is a perspective view of the invention showing its mode of use with the projector.

In Fig. 3 the filter and support are shown in use with a projector 18. The color screen 7 is provided with a color or tone which gradually increases in intensity or tone toward the middle of the screen and fades away toward the ends of the screen. Thus at the left hand end of the screen a brilliant yellow tone 19 simulating broad daylight can be painted or applied to the glass, deepening at 20, into sunset tones of rose and orange until at 21 violet tones deepen into midnight blue; at 22 this blue tone fades into pale gray lavender which gradually takes on a yellow and rose tone until at the right hand extremity of the screen a tone 23 corresponding to 19 is employed. A complete traverse of the screen across the projected beam 24 of the projector 18 will, therefore, project on any view, projected from a stationary slide, such color tones as will give the set scene a live look, involving all the natural transition from dawn to darkness. I have shown one repetition but in Fig. 3 naturally a more vivid effect is produced by a succession of such series, which can be thrown on the screen without having to turn the plate back in any way, or a mere reversal of the plate as shown will give repetition of the tones; such a repetition is shown on the color screen in Fig. 1.

I claim:

1. Apparatus for projecting colored beams of light, comprising a light source and a screen adapted to be placed in front of the source, the screen consisting of a base, a rectangular frame mounted thereon, a color screen fastened in the frame provided with a series of translucent merging colors, parallel guide bars in which the frame is slidably mounted, a screw threaded rod, and a screw threaded member rigidly attached to the frame, threading on the rod and adapted to carry the frame along the bars when the screw rod is turned to produce an even and undefined color cycle from the light beam.

2. Apparatus for projecting colored beams of light, comprising a projector, and a screen adapted to be placed in front of the projector, consisting of a base, a frame slidably mounted thereon, a color screen fastened in the frame, provided with a series of merging translucent colors, a screw threaded rod, a screw threaded member rigidly attached to the frame threading on the rod and adapted to carry the screen along the beam of the projector when the screw rod is turned to produce an even and undefined color cycle from the light beam.

3. Apparatus for projecting colored beams of light, comprising a projector, and a screen adapted to be placed in front of the projector, consisting of a base, a color screen slidably mounted thereon, provided with a series of merging translucent colors, a screw threaded rod, and a screw threaded member rigidly attached to the screen, threading on the rod and adapted to carry the screen along the beam of the projector when the screw rod is turned to produce an even and undefined colored cycle from the light beam.

Signed at London, England, this 22nd day of April, 1924.

PERCY WILLIAM BERRY.